(12) United States Patent
Otsu et al.

(10) Patent No.: US 12,527,969 B2
(45) Date of Patent: Jan. 20, 2026

(54) TREATMENT METHOD AND TREATMENT SYSTEM

(71) Applicant: TERUMO KABUSHIKI KAISHA, Tokyo (JP)

(72) Inventors: Keiko Otsu, Kanagawa (JP); Hideto Nagata, Shizuoka (JP); Yuuji Onimura, Shizuoka (JP); Keiichiro Yamamoto, Shizuoka (JP); Miho Kai, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 950 days.

(21) Appl. No.: 17/411,499

(22) Filed: Aug. 25, 2021

(65) Prior Publication Data

US 2021/0379398 A1    Dec. 9, 2021

Related U.S. Application Data

(63) Continuation of application No. PCT/JP2020/007930, filed on Feb. 27, 2020.

(30) Foreign Application Priority Data

Feb. 28, 2019    (JP) ............................ 2019-036322

(51) Int. Cl.
*A61N 5/06*    (2006.01)
*A61K 41/00*    (2020.01)
(Continued)

(52) U.S. Cl.
CPC ........ *A61N 5/0601* (2013.01); *A61K 41/0057* (2013.01); *A61K 47/6803* (2017.08);
(Continued)

(58) Field of Classification Search
CPC .................. A61N 5/0601; A61N 5/062; A61N 2005/063; A61N 2005/0659; A61K 41/0057

See application file for complete search history.

(56) References Cited

U.S. PATENT DOCUMENTS

| 6,730,061 B1 | 5/2004 | Cuschieri et al. |
| 2011/0213349 A1 | 9/2011 | Brown |

(Continued)

FOREIGN PATENT DOCUMENTS

| JP | H119707 A | 1/1999 |
| JP | H11309155 A | 11/1999 |

(Continued)

OTHER PUBLICATIONS

English Translations of the International Search Report (Form PCT/ISA/210) and the Written Opinion of the International Searching Authority (Form PCT/ISA/237) issued Apr. 21, 2020, by the Japanese Patent Office in corresponding International Application No. PCT/JP2020/007930. (8 pages).

(Continued)

*Primary Examiner* — Carl H Layno
*Assistant Examiner* — Maria Catherine Anthony
(74) *Attorney, Agent, or Firm* — Buchanan Ingersoll & Rooney PC

(57) ABSTRACT

A treatment method and a treatment system capable of effectively irradiating an antibody-photosensitive substance bound to a tumor cell with a near-infrared ray. The treatment method includes: intravenously administering the antibody-photosensitive substance; inserting a guide wire and a catheter into a main artery of an organ having the tumor cell; removing the guide wire; inserting an optical fiber into the catheter and advancing the optical fiber to a target position while checking a position of the optical fiber with an (Continued)

orientation marker disposed on the optical fiber; and irradiating the antibody-photosensitive substance bound to a tumor cell membrane with the near-infrared ray from the optical fiber while reducing an influence of blood in the artery on the near-infrared ray after 12 hours to 36 hours from intravenous administration.

20 Claims, 8 Drawing Sheets

(51) Int. Cl.
*A61K 47/68* (2017.01)
*A61B 17/00* (2006.01)
*A61B 17/12* (2006.01)
*A61B 18/00* (2006.01)
*A61M 25/10* (2013.01)
*A61M 39/00* (2006.01)

(52) U.S. Cl.
CPC .... *A61N 5/062* (2013.01); *A61B 2017/00106* (2013.01); *A61B 17/12022* (2013.01); *A61B 2018/00791* (2013.01); *A61M 2025/1052* (2013.01); *A61M 2039/0018* (2013.01); *A61N 2005/0602* (2013.01); *A61N 2005/0628* (2013.01); *A61N 2005/063* (2013.01); *A61N 2005/0659* (2013.01)

(56) References Cited

U.S. PATENT DOCUMENTS

| 2017/0246472 A1* | 8/2017 | Chen ................. A61M 37/0092 |
| 2018/0113246 A1 | 4/2018 | Rose et al. |
| 2021/0379395 A1 | 12/2021 | Otsu et al. |
| 2021/0379396 A1 | 12/2021 | Otsu et al. |

FOREIGN PATENT DOCUMENTS

| JP | 2014523907 A | 9/2014 | |
| JP | 2018528268 A | 9/2018 | |
| WO | WO-9505214 A1 * | 2/1995 | .......... A61N 5/0601 |
| WO | 2013009475 A1 | 1/2013 | |
| WO | 2015117067 A1 | 8/2015 | |
| WO | WO-2017031367 A1 * | 2/2017 | ......... A61K 41/0071 |

OTHER PUBLICATIONS

International Search Report (PCT/ISA/210) and Written Opinion (PCT/ISA/237) mailed on Apr. 21, 2020, by the Japanese Patent Office as the International Searching Authority for International Application No. PCT/JP2020/007932.

International Search Report (PCT/ISA/210) with translation and Written Opinion (PCT/ISA/237) mailed on Apr. 21, 2020, by the Japanese Patent Office as the International Searching Authority for International Application No. PCT/JP2020/007930.

International Search Report (PCT/ISA/210) with translation and Written Opinion (PCT/ISA/237) mailed on Apr. 21, 2020, by the Japanese Patent Office as the International Searching Authority for International Application No. PCT/JP2020/007931. (9 pages).

* cited by examiner

TREATMENT METHOD AND TREATMENT SYSTEM

CROSS-REFERENCES TO RELATED APPLICATIONS

This application is a continuation of International Application No. PCT/JP2020/007930 filed on Feb. 27, 2020, which claims priority to Japanese Patent Application No. 2019-036322 filed on Feb. 28, 2019, the entire contents of both of which is incorporated herein by reference.

FIELD OF THE DISCLOSURE

The present disclosure generally relates to a treatment method and a treatment system for killing tumor cells.

BACKGROUND DISCUSSION

As a treatment method for killing tumor cells such as cancer cells, a method using a photosensitive substance is known. In this treatment method, an antibody-photosensitive substance obtained by binding an antibody that specifically binds only to a specific antigen on the surface of a cancer cell and a photosensitive substance that is paired with the antibody is used as a drug. For example, in a treatment method using an antibody-photosensitive substance obtained by binding an antibody and hydrophilic phthalocyanine (IR700), which is a substance that reacts with a near-infrared ray in the vicinity of a wavelength of 700 nm, by irradiating the photosensitive substance accumulated in the tumor with a near-infrared ray, it is possible to specifically kill target cells without killing non-target cells such as normal cells. Therefore, by using this method, it is expected that a relatively high therapeutic effect can be obtained while reducing side effects.

Meanwhile, in order to obtain a high therapeutic effect of photosensitive substance, it is necessary to reliably irradiate the antibody-photosensitive substance bound to a tumor cell membrane with a near-infrared ray. However, the depth of near-infrared ray into the tissue is relatively short. Therefore, it is difficult to deliver light from the body surface non-invasively. Therefore, means for reliably delivering light to the tumor while suppressing invasiveness is desired. For example, U.S. Patent Application Publication No. 2018/0113246 A1 discloses a method of transvascularly inserting an elongated device having an optical fiber into the vicinity of tumor, and irradiating with light from the inside of the blood vessel.

Even when transvascularly irradiating with light, blood is present in the blood vessel. For this reason, it is not relatively easy to reliably deliver light to the tumor by a device inserted into the blood vessel.

SUMMARY

A treatment method and a treatment system are disclosed capable of effectively irradiating an antibody-photosensitive substance bound to a tumor cell with a near-infrared ray.

According to an aspect of the present disclosure, a treatment method is disclosed for irradiating an antibody-photosensitive substance bound to a tumor cell membrane in a tumor cell with a near-infrared ray, the method including: intravenously administering the antibody-photosensitive substance; inserting a guide wire into a main artery of an organ having the tumor cell, and inserting a catheter along the guide wire; removing the guide wire from the catheter; inserting an optical fiber into the catheter and advancing the optical fiber to a target position while checking a position of the optical fiber with an orientation marker disposed on the optical fiber; and irradiating the antibody-photosensitive substance bound to the tumor cell membrane with the near-infrared ray from the optical fiber while reducing an influence of blood in the artery on the near-infrared ray after 12 hours to 36 hours from the intravenous administration.

According to the treatment method having the above-described configuration, the optical fiber inserted into the blood vessel can irradiate the antibody-photosensitive substance bound to the tumor cell membrane with the near-infrared ray. Therefore, according to the treatment method, it is possible to effectively transvascularly irradiate the antibody-photosensitive substance bound to the tumor cell membrane with the near-infrared ray.

According to another aspect of the present disclosure, a treatment method is disclosed for irradiating an antibody-photosensitive substance bound to a tumor cell membrane in a tumor cell with a near-infrared ray, the method including: inserting a guide wire into a main artery of an organ having the tumor cell, and inserting a catheter along the guide wire; removing the guide wire from the catheter; administering the antibody-photosensitive substance into the artery though the catheter; inserting an optical fiber into the catheter and advancing the optical fiber to a target position while checking a position of the optical fiber with an orientation marker disposed on the optical fiber; and irradiating the antibody-photosensitive substance bound to the tumor cell membrane with the near-infrared ray from the optical fiber while reducing an influence of blood in the artery on the near-infrared ray.

According to the treatment method having the above-described configuration, the optical fiber inserted into the blood vessel can irradiate the antibody-photosensitive substance bound to the tumor cell membrane with the near-infrared ray. Therefore, according to the treatment method, it is possible to effectively transvascularly irradiate the antibody-photosensitive substance bound to the tumor cell membrane with the near-infrared ray. Further, according to the treatment method, the antibody-photosensitive substance is locally administered, and thus, it is possible to bind the antibody-photosensitive substance to the tumor cell membrane in a short time with high probability. In addition, since the antibody-photosensitive substance can be administered only at a necessary place, the relative burden on the living body can be reduced.

When reducing the influence of blood in the artery on the near-infrared ray, a saline solution (i.e., saline) may be injected into the artery through the catheter to flush the blood in the artery. Accordingly, it becomes relatively difficult for the near-infrared ray emitted from the optical fiber to receive the influence of blood. Therefore, the near-infrared ray can effectively reach the antibody-photosensitive substance bound to the tumor cell membrane.

The saline solution may be injected into the artery between a lumen of the catheter and the optical fiber. Thereby, the saline solution can be injected into the artery using the catheter in which the optical fiber is inserted without using another device.

When reducing the influence of blood in the artery on the near-infrared ray, a balloon disposed in the catheter may be inflated to block a blood flow in the artery. Accordingly, it becomes difficult for the near-infrared ray emitted from the optical fiber to receive the influence of blood. Therefore, the near-infrared ray can effectively reach the antibody-photosensitive substance bound to the tumor cell membrane.

In the emitting of the near-infrared ray from the optical fiber, the irradiation of the antibody-photosensitive substance with the near-infrared ray may be monitored. Accordingly, it is possible to proceed with the procedure while checking that the tumor cell is killed as the temperature of the antibody-photosensitive substance irradiated with the near-infrared ray increases.

In the monitoring, a temperature of a tumor cell having a tumor cell membrane to which the antibody-photosensitive substance is bound or a vicinity of the tumor cell may be monitored by the optical fiber that emits the near-infrared ray. Accordingly, it is possible to proceed with the procedure while checking that the tumor cell is killed as the temperature of the antibody-photosensitive substance irradiated with the near-infrared ray increases. Further, by using the optical fiber for temperature measurement, it is possible to effectively monitor the temperature at a distant position in a non-contact manner. In addition, since the monitoring is performed using the optical fiber that emits the near-infrared ray, it is not necessary to insert another device for temperature measurement into the catheter, and the procedure becomes relatively easier.

In the monitoring, an optical fiber for measurement may be inserted into the catheter, and a temperature of a tumor cell having a tumor cell membrane to which the antibody-photosensitive substance is bound or a vicinity of the tumor cell membrane may be monitored by the optical fiber for measurement. Accordingly, it is possible to proceed with the procedure while checking that the tumor cell is killed as the temperature of the antibody-photosensitive substance irradiated with the near-infrared ray increases. Further, by using the optical fiber for temperature measurement, it is possible to effectively monitor the temperature at a distant position in a non-contact manner.

In the monitoring, a hardness measurement device having a probe capable of transmitting and receiving ultrasound waves may be inserted into the catheter, and a hardness of a tumor tissue mass having a tumor cell membrane to which the antibody-photosensitive substance is bound may be monitored by the hardness measurement device. Accordingly, it is possible to proceed with the procedure while checking that the tumor cell is killed. Further, by using the hardness measurement device using ultrasound waves, it is possible to effectively monitor the hardness at a distant position in a non-contact manner.

In the monitoring, a contact type temperature sensor may be inserted into the catheter, and a temperature of a tumor cell having a tumor cell membrane to which the antibody-photosensitive substance is bound or a vicinity of the tumor cell membrane may be monitored by the temperature sensor. Accordingly, it is possible to proceed with the procedure while checking that the tumor cell is killed as the temperature of the antibody-photosensitive substance irradiated with the near-infrared ray increases.

The treatment method may further include specifying (i.e., identifying) a site or location irradiated with the near-infrared ray after the emitting of the near-infrared ray from the optical fiber. Thereby, a site (or a location) that has been irradiated with the near-infrared ray can be specified or identified, the subsequent procedure can be advanced smoothly, and postoperative follow-up can be effectively performed. For example, in a case of irradiating a plurality of places with the near-infrared ray, the specifying of the site irradiated with the near-infrared ray is rather effective because the site that has been irradiated with the near-infrared ray can be accurately identified.

According to still another aspect of the present disclosure, a treatment system is disclosed that is capable of irradiating an antibody-photosensitive substance bound to a tumor cell membrane with a near-infrared ray, the system including: a catheter having a lumen; an optical fiber insertable into the lumen and capable of emitting the near-infrared ray; and a measurement device that is insertable into the lumen and monitors irradiation of a site, which is irradiated with the near-infrared ray, with the near-infrared ray.

According to the treatment system having the above-described configuration, the optical fiber inserted into the blood vessel can transvascularly irradiate the antibody-photosensitive substance with the near-infrared ray. Therefore, the antibody-photosensitive substance bound to the tumor cell membrane can be effectively irradiated with the near-infrared ray, and the effect of killing tumor cells can be enhanced. Further, it is possible to proceed with the procedure while checking with the measurement device that the antibody-photosensitive substance receives the near-infrared ray, the temperature increases, and the tumor cell is killed.

BRIEF DESCRIPTION OF THE DRAWINGS

FIG. 3A shows a case where a near-infrared ray is emitted in a distal end direction, and FIG. 3B shows a case where the near-infrared ray is emitted in a direction orthogonal to an optical fiber.

FIG. 4A shows a case where the near-infrared ray is emitted in the distal end direction, and FIG. 4B shows a case where the near-infrared ray is emitted in the direction orthogonal to the optical fiber.

FIG. 6A shows a modification example of an elongated tube, and FIG. 6B shows another modification example of the elongated tube.

FIG. 9A shows a state where an outer needle has punctured a tumor, and FIG. 9B shows a state where an inner needle has punctured the tumor.

FIG. 12A shows a state where the outer needle has punctured a tumor, and FIG. 12B shows a state where the inner needle has punctured the tumor.

DETAILED DESCRIPTION

Figure 1:
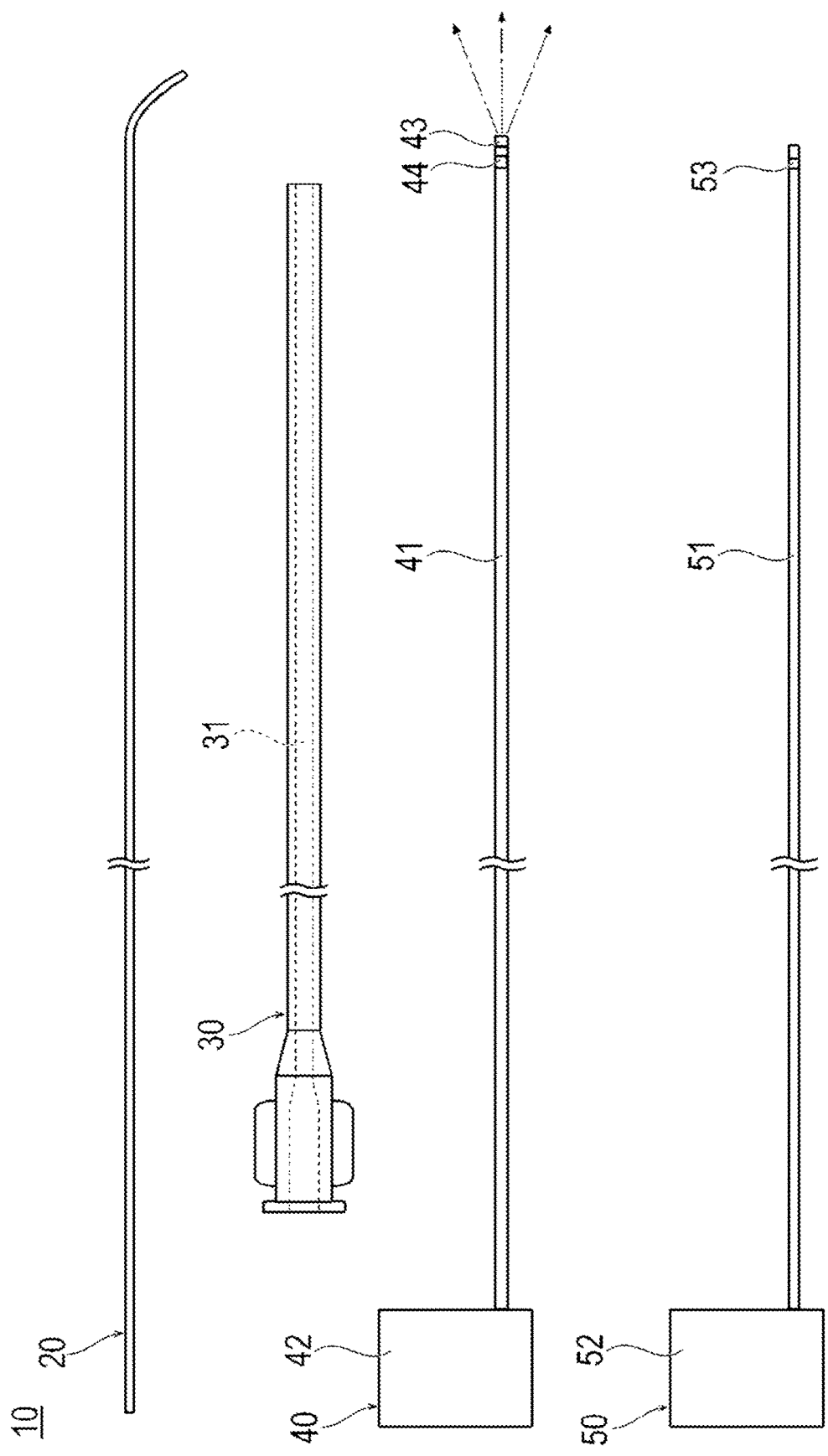
FIG. 1 is a plan view showing a treatment system used in a treatment method according to a first embodiment.

Set forth below with reference to the accompanying drawings is a detailed description of embodiments of a treatment method and a treatment system for killing tumor cells representing examples of the inventive treatment method and treatment system for killing tumor cells. Note that, the dimensions of the drawings are exaggerated for convenience of description and may differ from the actual dimensions. Further, in the present specification and drawings, components having the same or substantially the same functional configuration will be denoted by the same reference numerals, and detailed description will be omitted. In the present specification, the side of a device that is inserted into a biological lumen is referred to as the "distal side", and the hand-side that is operated is referred to as the "proximal side".

First Embodiment

A treatment method according to a first embodiment is photoimmunotherapy for killing target cells by transvascularly irradiating an antibody-photosensitive substance bound to a cell membrane of the target cell with a near-infrared ray. The target cell is a tumor cell such as a cancer cell. In this treatment method, an antibody-photosensitive substance obtained by binding an antibody that specifically binds only to a specific antigen on the surface of the tumor cell and a photosensitive substance that is paired with the antibody is used as a drug. The antibody is not particularly limited, and examples of the antibody include panitumumab, trastuzumab, HuJ591, and the like. The photosensitive substance can be, for example, hydrophilic phthalocyanine, which is a substance (IR700) that reacts with a near-infrared ray having a wavelength of approximately 700 nm, but is not limited to hydrophilic phthalocyanine. IR700 can absorb light when receiving near-infrared rays having a wavelength of approximately 660 nm to 740 nm, which generates a chemical change, and generates heat to kill tumor cells. When the IR700 attached to the cell membrane receives near-infrared rays having a wavelength of approximately 660 nm to 740 nm, the ligand of the functional group that guarantees water solubility is cut off, and the structural change from water-soluble to hydrophobic occurs. This structural change from water-soluble to hydrophobic pulls out the membrane protein, which opens a hole in the cell membrane and allows water to enter the cell, and accordingly, the cancer cell can be ruptured and killed. Accordingly, the IR700 can kill the cancer cells by receiving the near-infrared rays having a wavelength of approximately 660 nm to 740 nm. The treatment method according to the first embodiment is suitable for cancer treatment of organs that are rather difficult to be irradiated with a near-infrared ray from the body surface because the organs are separated from the body surface, for example. The treatment method according to the first embodiment can be suitably used, for example, for the treatment of liver cancer, lung cancer, and the like.

In the treatment method according to the first embodiment, in order to transvascularly irradiate the antibody-photosensitive substance bound to the target cell with the near-infrared ray, as shown in FIG. 1, a treatment system 10 that can be inserted into a blood vessel is used. First, the treatment system 10 will be described.

The treatment system 10 can include a guide wire 20, a catheter 30, a light irradiation device 40 that can be inserted into the catheter 30, and a measurement device 50 that can be inserted into the catheter 30.

Figure 4A:
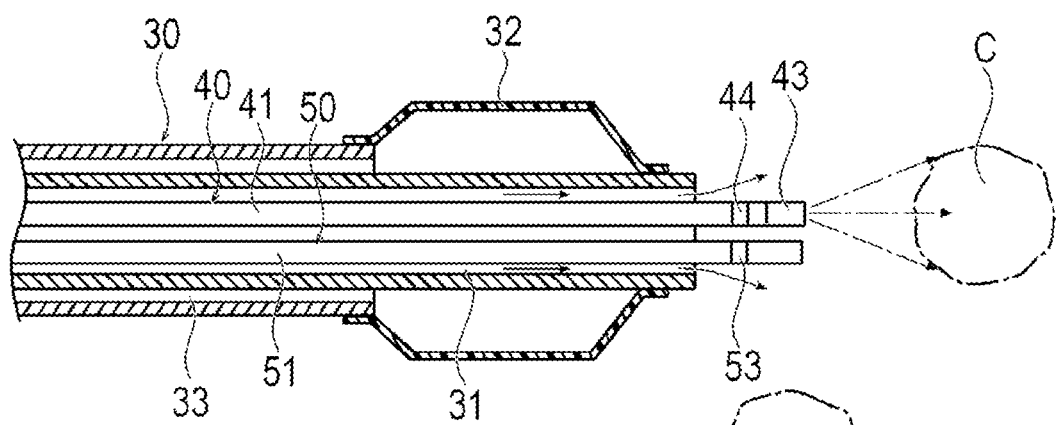
FIGS. 4A and 4B are cross-sectional views showing the treatment system when treating the liver cancer using a balloon catheter.
Figure 4B:
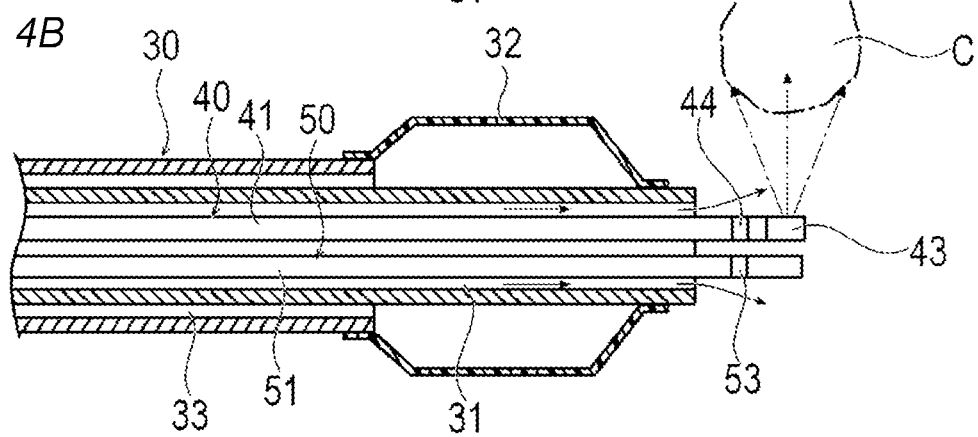

The guide wire 20 is an elongated wire for guiding the catheter 30 to a target position in a living body. The catheter 30 is a micro-catheter, for example, and has a lumen 31 extending from the distal end to the proximal end of the catheter 30. The micro-catheter can be a relatively thin catheter that can be inserted into a peripheral blood vessel of an organ to be treated. The diameter of the micro-catheter can be, for example, approximately 0.5 nm to 1.0 mm. The catheter 30 may be a catheter 30 thicker than the micro-catheter depending on the location to be treated. Further, as shown in FIGS. 4A and 4B, the catheter 30 may be a balloon catheter 30 including an inflatable balloon 32 at the distal portion. The balloon catheter 30 has a second lumen 33 for supplying a fluid for inflation to the balloon 32.

Figure 3A:
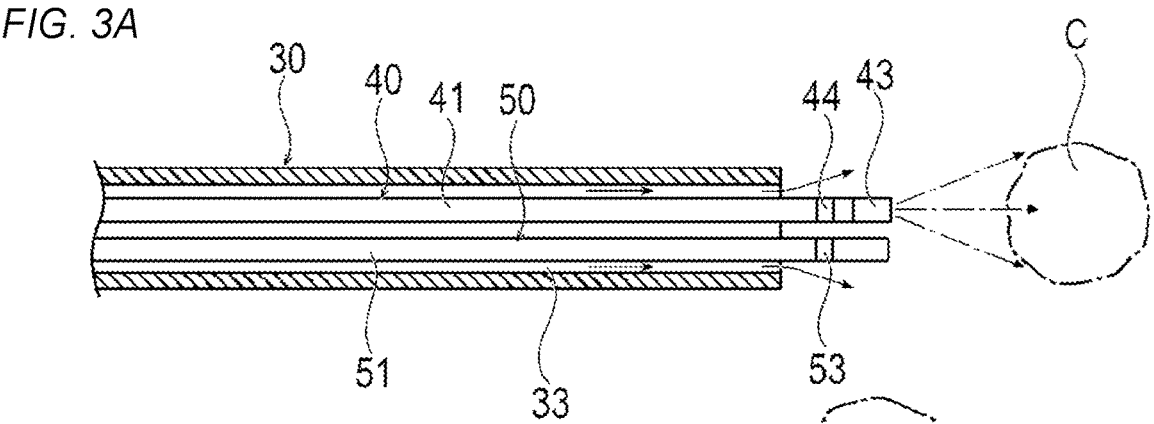
FIGS. 3A and 3B are cross-sectional views showing the treatment system when treating the liver cancer.

As shown in FIGS. 1 and 3A, the light irradiation device 40 includes an optical fiber 41 and a light output unit 42 that supplies near-infrared rays to the optical fiber 41. The light output unit 42 can output a near-infrared ray having any wavelength to the optical fiber 41 with any dose. The light output unit 42 outputs the near-infrared ray to the optical fiber 41 so that the light can be emitted, for example, at a wavelength of 660 nm to 740 nm, and for example, with a dose of 1 $Jcm^{-2}$ to 50 $Jcm^{-2}$. The optical fiber 41 that outputs near-infrared rays may be composed of a single fiber or may be composed of a plurality of bundled fibers. The optical fiber 41 is preferably attachable and detachable to and from the light output unit 42, but is not limited to an optical fiber 41 that is attachable and detachable to and from the light output unit 42. An irradiation unit 43 for emitting light is provided at the distal end of the optical fiber 41. An orientation marker 44 is provided at the distal portion of the optical fiber 41.

Figure 3B:
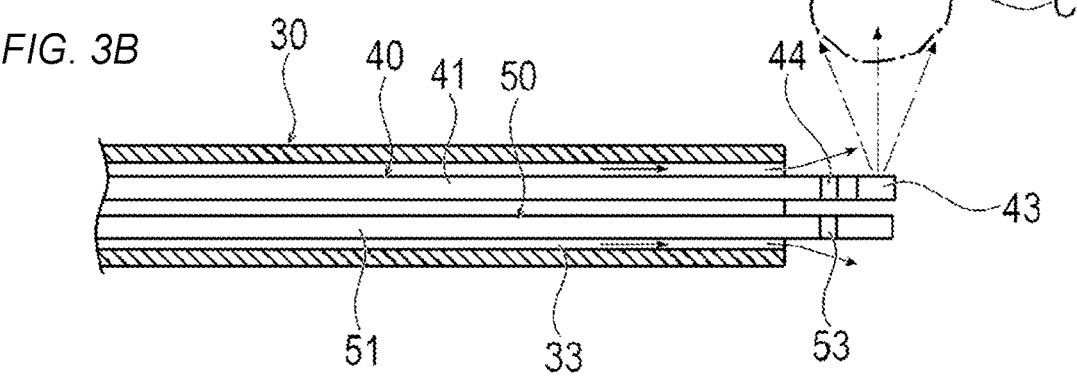

The irradiation unit 43 emits light that has entered from the proximal side of the optical fiber 41 to the outside. The irradiation unit 43 can be configured by, for example, a part where a core is exposed, a lens, a diffuser, a mirror, and the like. The irradiation unit 43 is appropriately designed so as to emit a near-infrared ray at a predetermined irradiation angle in a predetermined direction using the part where the core is exposed, the lens, the diffuser, the mirror, or the like. The structure of the irradiation unit 43 is not limited as long as irradiation unit 43 can emit light to the outside. For example, as shown in FIG. 3A, the irradiation unit 43 emits a near-infrared ray at a predetermined irradiation angle in the distal end direction. Note that, the irradiation direction (the direction in which the center of the irradiation angle is positioned) is not particularly limited. For example, as shown in FIG. 3B, the irradiation unit 43 may emit the near-infrared ray in a direction substantially orthogonal to the optical fiber 41.

The orientation marker 44 is a site for an operator to check a position in the body. The orientation marker 44 can be formed of, for example, a radiopaque material. The radiopaque material can be, for example, a metal material such as a metal such as gold, platinum, and tungsten, or an alloy containing gold, platinum, and/or tungsten. Thereby, the operator can check the position of the orientation marker 44 under X-ray contrast outside the body. The orientation marker 44 may not be an X-ray contrast marker as long as the operator can check the position in the body.

As shown in FIGS. 1 and 3A, the measurement device 50 is a device that monitors in real time that a tumor C having target cells can be irradiated with a near-infrared ray. The measurement device 50 is, for example, a temperature measurement device that can measure the temperature of the tumor C in a non-contact manner or in a contact manner. The measurement device 50 includes, for example, an optical fiber for measurement 51, an optical measurement unit 52 that receives light detected by the optical fiber for measurement 51, and a measurement marker 53 that is positioned at the distal portion of the optical fiber for measurement 51. The optical fiber for measurement 51 receives an infrared ray emitted from an object of which the temperature has increased at the distal portion and transmits the infrared ray to the optical measurement unit 52. The optical measurement unit 52 can detect the temperature of the object in a non-contact manner from the measured infrared ray dose or the like.

The optical fiber for measurement 51 may be shared with the optical fiber 41 of the light irradiation device 40. In other words, the temperature of the tumor C may be measured using the optical fiber 41 of the light irradiation device 40.

The measurement device 50 is not limited to the temperature measurement device using the optical fiber 41 as long as it is possible to monitor that the tumor cell to which the antibody-photosensitive substance is bound is irradiated with the near-infrared ray. For example, a contact-type temperature measurement device using a thermocouple or a hardness measurement device 50 using ultrasound waves may be used. When the measurement device 50 is the hardness measurement device 50 using ultrasound waves, an ultrasound probe is provided at the distal portion of an elongated tubular body that can be inserted into the catheter 30. The hardness measurement device 50 transmits the ultrasound wave to the outside by the probe and receives the reflected wave of the ultrasound wave to calculate a tomographic image of the tissue. The hardness measurement device 50 can detect a change in the hardness (hardness of a tumor tissue mass having a tumor cell membrane) of the tumor C including dead tumor cells from the change in the luminance of the tomographic image. Alternatively, the measurement device 50 may be a sensor that can detect an elastic change of the tumor C including dead tumor cells and a change in blood flow.

Next, the treatment method according to the first embodiment will be described taking a case of treating liver cancer as an example. Note that, this description is not intended to limit the organs to be treated.

Figure 2:
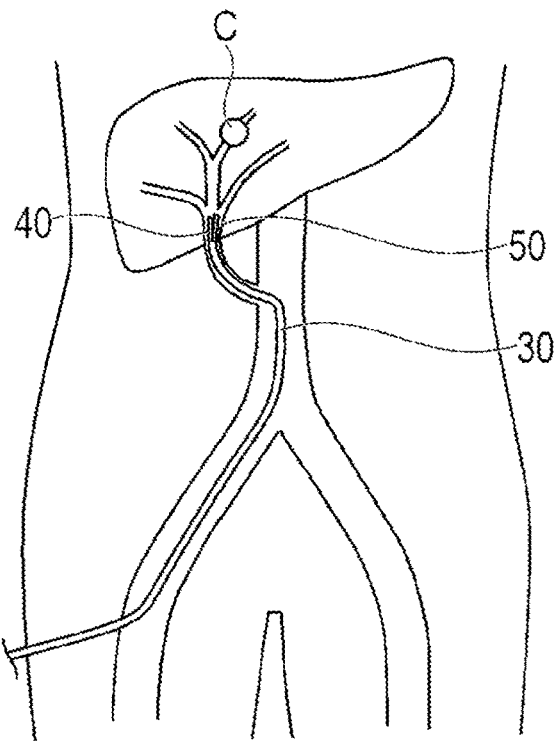
FIG. 2 is a schematic view showing a state inside a body when treating liver cancer by the treatment method according to the first embodiment.

First, an antibody-photosensitive substance is administered intravenously. After approximately 12 hours to 36 hours from the intravenous administration, as shown in FIG. 2, the operator inserts the guide wire 20 into the blood vessel from the femoral artery, brachial artery, radial artery, and the like. Next, the proximal end of the guide wire 20 is inserted into the lumen 31 of the catheter 30, and the catheter 30 is inserted into the blood vessel along the guide wire 20. Next, the catheter 30 is inserted into the hepatic artery, which is the main artery (for example, nutrient artery) of the liver in which the tumor C is formed, with the guide wire 20 in advance. Thereafter, the operator removes the guide wire 20 from the catheter 30. In the treatment of lung cancer, the main artery of the lung is the bronchial artery.

Next, the operator inserts the optical fiber 41 into the lumen 31 from the proximal side of the catheter 30. As shown in FIG. 3A, the distal portion of the optical fiber 41 protrudes from the catheter 30 toward the distal side. Next, the operator causes the position of the orientation marker 44 of the optical fiber 41 to reach the target position while checking the position of the orientation marker 44 of the optical fiber 41 under X-ray contrast. The target position is a position which is close to the tumor C and where the tumor C can be irradiated with the near-infrared ray.

Next, the operator inserts the optical fiber for measurement 51 into the lumen 31 from the proximal side of the catheter 30. The distal portion of the optical fiber for measurement 51 protrudes from the catheter 30 toward the distal side. Next, the operator causes the position of the measurement marker 53 of the optical fiber for measurement 51 to reach the target position while checking the position of the measurement marker 53 of the optical fiber for measurement 51 under X-ray contrast. The target position is a position which is close to the tumor C, which is the cancer cell, and where the temperature of the tumor C can be measured. The optical fiber for measurement 51 is preferably disposed at a position where the emission of the near-infrared ray from the optical fiber 41 is not obstructed.

Next, the operator supplies the saline solution to the lumen 31 from the proximal side of the catheter 30. At this time, for example, the operator connects a Y connector to a hub positioned at the proximal portion of the catheter 30, and supplies the saline solution from a port different from the port from which the guide wire 20 is led out. The saline solution flows into the hepatic artery through a gap (i.e., between the inner diameter of the catheter and an outer diameter of the optical fiber 41) in the lumen 31 into which the optical fiber 41 and the optical fiber for measurement 51 are inserted. Accordingly, the saline solution is injected (flushed) from the catheter 30 to the hepatic artery. Therefore, blood in the hepatic artery where the optical fiber 41 and the optical fiber for measurement 51 are positioned is flushed, and the hepatic artery is temporarily filled with the saline solution. The saline solution is injected into the artery through the lumen 31 of the catheter 30 and the optical fiber 41. Thereby, the saline solution can be injected into the hepatic artery using the catheter 30 into which the optical fiber 41 is inserted without using another device.

As shown in FIG. 4A, when the catheter 30 has the balloon 32, the balloon 32 may be inflated before, during, or after flushing the saline solution. Thereby, the blood flow in the hepatic artery is blocked and the hepatic artery is temporarily filled with the saline solution. For this reason, the hepatic artery can be more reliably filled with the saline solution. Note that, the operator may inflate the balloon 32 without flushing the saline solution.

After filling the hepatic artery with the saline solution or blocking the blood flow in the hepatic artery, the operator may observe the inside of the hepatic artery with the optical fiber 41 or the optical fiber for measurement 51. Thereby, the operator can accurately check that the hepatic artery is filled with the saline solution and/or that the blood flow in the hepatic artery is blocked. In accordance with an aspect, observation of blood in the hepatic artery using the optical fiber 41 or the optical fiber for measurement 51 may not be performed.

Next, as shown in FIGS. 3A or 4A, the temperature of the tumor C is measured by the optical fiber for measurement 51 while emitting the near-infrared ray from the optical fiber 41. The irradiation with the near-infrared ray starts 12 hours to 36 hours after intravenous administration. The operator can monitor that the tumor cell to which the antibody-photosensitive substance is bound is irradiated with the near-infrared ray by continuing the temperature measurement of the tumor C. At this time, since the hepatic artery is filled with the saline solution and/or the blood flow in the hepatic artery is blocked, the irradiation with the near-infrared ray and the temperature measurement are hardly affected by blood. Therefore, the near-infrared ray can effectively reach the antibody-photosensitive substance bound to the tumor cell membrane. Therefore, the irradiation with the near-infrared ray and the temperature measurement can be performed rather effectively. When emitting the near-infrared ray from the optical fiber 41, the near-infrared ray is directly emitted from the optical fiber 41 to the biological tissue. In other words, the near-infrared ray is not indirectly emitted from the inside of the balloon through the balloon, for example. For this reason, the tumor cell to which the antibody-photosensitive substance is bound can be effectively irradiated with the near-infrared ray.

The irradiation direction of the near-infrared ray from the optical fiber 41 is the distal end direction of the optical fiber 41. Alternatively, as shown in FIGS. 3B or 4B, the irradiation direction of the near-infrared ray may be a direction orthogonal to the axial direction of the optical fiber 41. The operator can appropriately select the optical fiber 41 to be used according to the position of the tumor C with respect to the blood vessel into which the optical fiber 41 is inserted.

The operator continues the irradiation with the near-infrared ray while checking the death of the tumor cells by the irradiation with the near-infrared ray based on the temperature of the tumor C monitored by the measurement device 50. The operator may adjust the irradiation direction and position by operating the optical fiber 41 at hand during emission of the near-infrared ray.

When it is determined that the tumor cells have been sufficiently killed, when it is determined that further irradiation is not desirable, or when a predetermined time has elapsed, the operator stops the irradiation with the near-infrared ray and stops monitoring by the measurement device 50. In order to make the determination that the tumor cells have been sufficiently killed easier, a temperature threshold value that is a condition for stopping the irradiation may be set in advance. When the temperature of the tumor C to be measured exceeds the temperature threshold value, the operator can rather easily determine that the irradiation with the near-infrared ray can be stopped. The threshold value may be set in the optical measurement unit 52. Thereby, the optical measurement unit 52 can give a notice to the operator, for example, via the monitor, the speaker, or the like when the temperature of the tumor C to be measured exceeds the threshold value. Note that, the condition for stopping the irradiation with the near-infrared ray may not be the temperature of the tumor C exceeding the threshold value, but may be, for example, the temperature of a portion (for example, a volume or an area) of the tumor C exceeding a threshold value. Alternatively, the optical measurement unit 52 may have an irradiation time of the near-infrared ray set in advance.

Next, the operator specifies and records the position of the tumor C that has been irradiated with the near-infrared ray. The position of the tumor C is desirably recorded as electronic data so as to correspond to position information of data such as a CT image or an MRI image of a patient acquired in advance. Thereby, the subsequent procedure can be advanced smoothly, and postoperative follow-up can be effectively performed. For example, when irradiating a plurality of tumors C with the near-infrared ray, the tumor C that has been irradiated with the near-infrared ray can be accurately identified, and accordingly, the irradiation of all tumors C can be performed rather smoothly and reliably.

The monitoring of the irradiation with the near-infrared ray may be performed by the optical fiber 41 for near-infrared ray irradiation, the temperature measurement device using a thermocouple, or the hardness measurement device using ultrasound waves, instead of the optical fiber for measurement 51. Further, the monitoring of the irradiation with the near-infrared ray may be performed by a sensor positioned outside the body or a sensor inserted into a lumen in a living body. Next, the operator removes the catheter 30 together with the optical fiber 41 and the measurement device 50 from the skin.

As described above, the treatment method according to the first embodiment is the treatment method for irradiating the antibody-photosensitive substance bound to the tumor cell membrane in the tumor cell with the near-infrared ray, the method including: intravenously administering the antibody-photosensitive substance; inserting the guide wire 20 into a main artery of an organ having the tumor cell, and inserting the catheter 30 along the guide wire 20; removing the guide wire 20 from the catheter 30; inserting the optical fiber 41 into the catheter 30 and advancing the optical fiber 41 to a target position while checking a position of the optical fiber 41 with the orientation marker 44 disposed on the optical fiber 41; and irradiating the antibody-photosensitive substance bound to the tumor cell membrane with the near-infrared ray from the optical fiber 41 while reducing an influence of blood in the artery on the near-infrared ray after 12 hours to 36 hours from the intravenous administration.

According to the treatment method having the above-described configuration, the optical fiber 41 inserted into the blood vessel can irradiate the antibody-photosensitive substance bound to the tumor cell membrane with the near-infrared ray. Therefore, according to the treatment method, the antibody-photosensitive substance bound to the tumor cell membrane can be effectively transvascularly irradiated with the near-infrared ray, and the effect of killing the tumor cells can be enhanced.

The treatment system 10 used in the first embodiment capable of irradiating the antibody-photosensitive substance bound to the tumor cell membrane in the tumor cell with a near-infrared ray includes: the catheter 30 having the lumen 31; the optical fiber 41 insertable into the lumen 31 and capable of emitting the near-infrared ray; and the measurement device 50 that is insertable into the lumen 31 and monitors irradiation of a site, which is irradiated with the near-infrared ray, with the near-infrared ray.

According to the treatment system 10 having the above-described configuration, the optical fiber 41 inserted into the blood vessel can transvascularly irradiate the antibody-photosensitive substance with the near-infrared ray. Therefore, the antibody-photosensitive substance bound to the tumor cell membrane can be effectively irradiated with the near-infrared ray, and the effect of killing the tumor cells can be enhanced. Further, the operator can proceed with the procedure while checking with the measurement device 50 that the antibody-photosensitive substance receives the near-infrared ray, the temperature increases, and the tumor cell is killed.

Second Embodiment

Similar to the treatment method according to the first embodiment, a treatment method according to a second embodiment is applied to cancer treatment of an organ that can be reached transvascularly. The treatment method according to the second embodiment can be suitably used, for example, for the treatment of liver cancer, lung cancer, and the like. The treatment method according to the second embodiment is different from that of the first embodiment in that the antibody-photosensitive substance is not administered intravenously but locally into the nutrient blood vessel of the organ where the tumor C is formed. The treatment system is the same as the treatment system 10 used in the treatment method according to the first embodiment.

In the treatment method according to the second embodiment, the operator inserts the catheter 30 into the hepatic artery with the guide wire 20 in advance from, for example, the femoral artery, the brachial artery, the radial artery, and the like without intravenously administering the antibody-photosensitive substance. Next, the operator removes the guide wire 20 from the catheter 30. Next, the operator locally administers the antibody-photosensitive substance from the proximal side of the catheter 30 into the hepatic artery through the lumen 31. In the treatment of lung cancer, the antibody-photosensitive substance is locally administered to the bronchial artery, which is the nutrient artery of the lung to be treated.

After locally administering the antibody-photosensitive substance to the hepatic artery, the operator waits until the antibody-photosensitive substance binds to the target cell membrane. When the antibody-photosensitive substance is locally administered to the nutrient artery of the organ where the tumor C to be treated is present, the time until the antibody-photosensitive substance binds to the target cell membrane is much shorter than that for intravenous administration, and is considered to be, for example, approximately 5 minutes to 10 minutes.

Next, the operator inserts the optical fiber 41 into the lumen 31 from the proximal side of the catheter 30. Since the subsequent procedure is the same as the treatment method according to the first embodiment, a detailed description of the treatment method will be omitted. The irradiation with the near-infrared ray starts after approximately 5 minutes to 10 minutes from the local administration of the antibody-photosensitive substance. Alternatively, the irradiation with the near-infrared ray may not be started after approximately 5 minutes to 10 minutes.

As described above, the treatment method according to the second embodiment is the treatment method for irradiating the antibody-photosensitive substance bound to the tumor cell membrane in the tumor cell with the near-infrared ray, the method including: inserting the guide wire 20 into a main artery of an organ having the tumor cell, and inserting the catheter 30 along the guide wire 20; removing the guide wire 20 from the catheter 30; administering the antibody-photosensitive substance into the artery though the catheter 30; inserting the optical fiber 41 into the catheter 30 and advancing the optical fiber 41 to a target position while checking a position of the optical fiber 41 with the orientation marker 44 disposed on the optical fiber 41; and irradiating the antibody-photosensitive substance bound to the tumor cell membrane with the near-infrared ray from the optical fiber 41 while reducing an influence of blood in the artery on the near-infrared ray.

According to the treatment method having the above-described configuration, the optical fiber 41 inserted into the blood vessel can irradiate the antibody-photosensitive substance bound to the tumor cell membrane with the near-infrared ray. Therefore, according to the treatment method, the antibody-photosensitive substance bound to the tumor cell membrane can be effectively transvascularly irradiated with the near-infrared ray, and the effect of killing tumor cells can be enhanced. Further, according to the treatment method, the antibody-photosensitive substance is locally administered, and thus, it is possible to bind the antibody-photosensitive substance to the tumor cell membrane in a relatively short time with relatively high probability. In addition, since the antibody-photosensitive substance can be administered only at a necessary place, the burden on the living body can be reduced.

Third Embodiment

A treatment method according to a third embodiment is applied to cancer treatment of organs that can be reached from the mouth, the nose, or the anal using an endoscope. The treatment method according to the third embodiment can be suitably used for the treatment of, for example, pancreatic cancer, lung cancer, stomach cancer, duodenal cancer, esophageal cancer, colon cancer, and the like.

Figure 5:
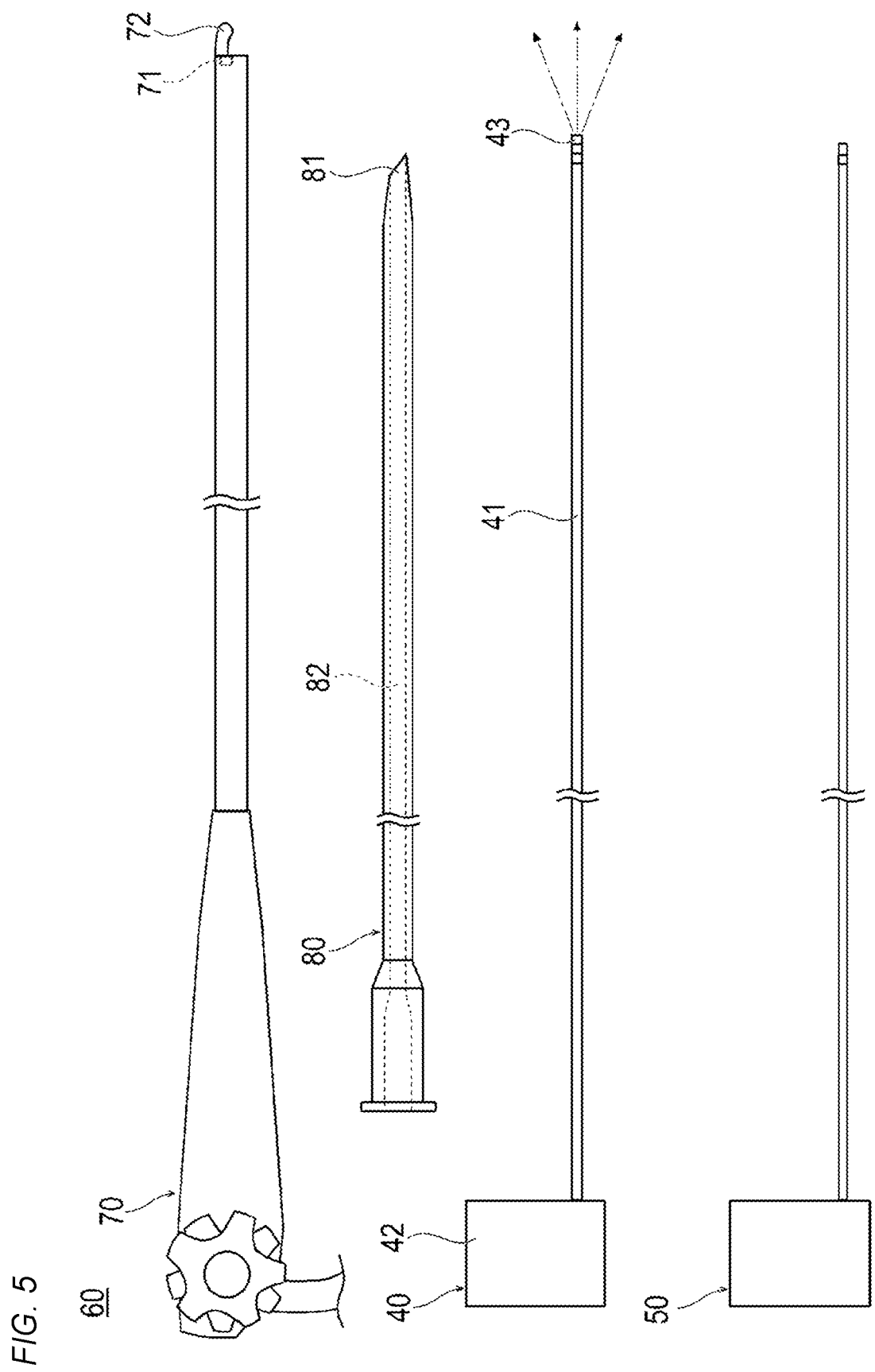
FIG. 5 is a plan view showing a treatment system used in a treatment method according to a third embodiment.

In the treatment method according to the third embodiment, in order to irradiate the antibody-photosensitive substance bound to the target cell with the near-infrared ray, as shown in FIG. 5, a treatment system 60 that can be inserted from the mouth, the nose, or the anal is used. First, the treatment system 60 will be described.

The treatment system 60 includes an endoscope 70, an elongated tube 80 that can be inserted into the endoscope 70, the light irradiation device 40 that can be inserted into the elongated tube 80, and the measurement device 50 that can be inserted into the elongated tube 80.

The endoscope 70 can be inserted from the mouth, the nose, or the anal, and a camera 71 capable of acquiring an image and an ultrasound imaging device 72 are disposed at the distal portion.

The endoscope 70 can acquire an image with the camera 71 in real time. Further, the endoscope 70 can acquire an ultrasound image in real time with the ultrasound imaging device 72. The endoscope 70 can acquire at least one of a camera image and an ultrasound image.

The elongated tube 80 has a sharp needle tip 81 formed at the distal end. The elongated tube 80 is hollow, and a lumen 82 penetrating from the needle at the distal end to the proximal end is formed (i.e., extending from the distal end to the proximal end of the elongated tube 80).

As in the first embodiment, the measurement device 50 is a temperature measurement device using the optical fiber 41 that irradiates near-infrared rays, a temperature measurement device using the optical fiber for measurement 51 different from the optical fiber 41, a temperature measurement device using a thermocouple, or a hardness measurement device using ultrasound waves. Unlike the first embodiment, the measurement device 50 in the third embodiment can measure the temperature in contact with the tumor C. Therefore, a temperature measurement device using a thermocouple can be suitably used as the measurement device 50. Alternatively, the measurement device 50 may be a sensor, for example, that can detect an elastic change of the tumor C having dead tumor cells or a change in blood flow.

Next, the treatment method according to the third embodiment will be described taking a case of treating stomach cancer as an example. Note that, this description of the third embodiment is not intended to limit the organs to be treated.

Figure 7:
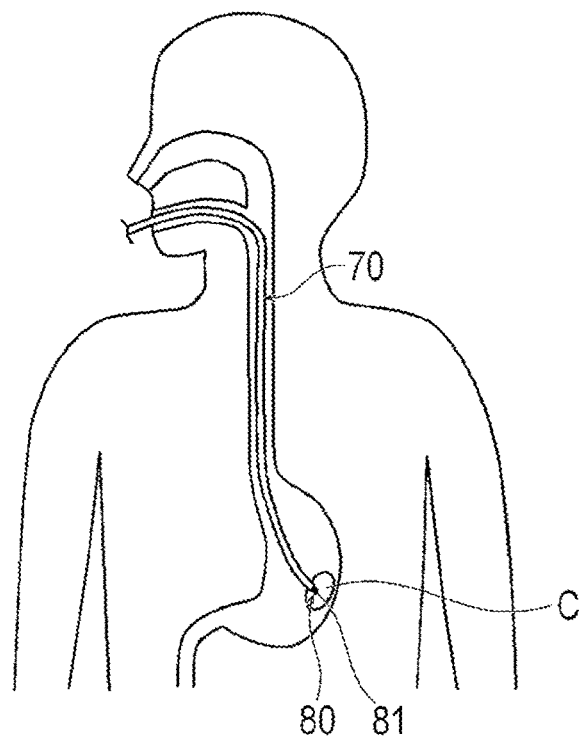
FIG. 7 is a schematic view showing a state inside a body when treating stomach cancer by the treatment method according to the third embodiment.
Figure 8:
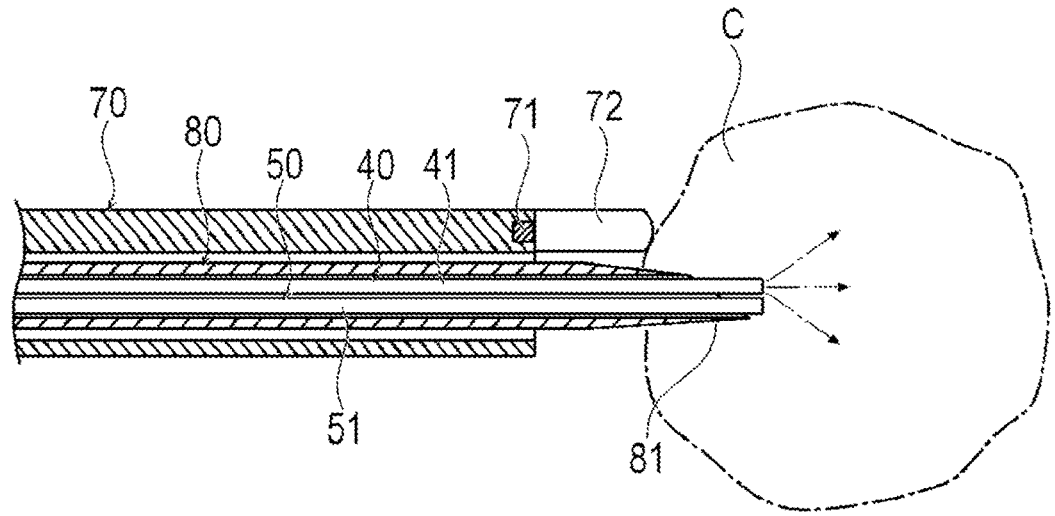
FIG. 8 is a cross-sectional view showing the treatment system when treating the stomach cancer.

First, the antibody-photosensitive substance is administered intravenously. After approximately 12 hours to 36 hours from intravenous administration, as shown in FIG. 7, the operator inserts the endoscope 70 from the mouth or the nose so that the endoscope 70 reaches the vicinity of the stomach cancer. Next, the operator inserts the elongated tube 80 into the proximal portion of the endoscope 70 and causes the elongated tube 80 to protrude from the distal portion of the endoscope 70. Next, as shown in FIG. 8, the operator brings the needle tip 81 of the elongated tube 80 into contact with the tumor C and puncture the tumor C while checking the camera image and/or ultrasound image of the endoscope 70. Thereby, the position of the elongated tube 80 is fixed with respect to the tumor C. The elongated tube 80 may be inserted into the mouth, the nose, or the anal together with the endoscope 70 in a state where the elongated tube 80 is disposed in advance in the endoscope 70.

Next, the operator inserts the optical fiber 41 and the measurement device 50 from the proximal side of the lumen 82 of the elongated tube 80. The distal portions of the optical fiber 41 and the measurement device 50 protrude from the needle tip 81 toward the distal side inside the hole formed in the tumor C by the needle tip 81. The optical fiber 41 and the measurement device 50 may not have to protrude from the needle tip 81. Further, the optical fiber 41 and/or the measurement device 50 may be inserted into the endoscope 70 in a state where the optical fiber 41 and/or the measurement device 50 are disposed in advance in the elongated tube 80.

Next, the operator measures the temperature or hardness of the tumor C with the measurement device 50 while emitting the near-infrared ray from the optical fiber 41. By continuing the measurement of the tumor C, it is possible to monitor in real time that the tumor cell to which the antibody-photosensitive substance is bound is irradiated with the near-infrared ray. The irradiation with the near-infrared ray starts, for example, 12 hours to 36 hours after intravenous administration.

The irradiation direction of the near-infrared ray from the optical fiber 41 is appropriately selected. For example, the irradiation direction of the near-infrared ray may be the distal end direction of the optical fiber 41, the direction orthogonal to the axial direction of the optical fiber 41, or all directions. The operator can appropriately select the optical fiber to be used according to the tumor C.

The operator continues the irradiation with the near-infrared ray while checking the death of the tumor cells by the irradiation with the near-infrared ray by monitoring with the measurement device 50. The operator can adjust the irradiation direction by operating the optical fiber 41 during the irradiation with the near-infrared ray.

The operator may bring the needle tip 81 of the elongated tube 80 into contact with the tumor C without puncturing the tumor C. Even when the elongated tube 80 is only in contact with the tumor C, the position of the elongated tube 80 with respect to the tumor C can be fixed. Therefore, the sharp needle tip 81 may not have to be formed at the distal portion of the elongated tube 80. Note that, when the elongated tube 80 comes into contact with the tumor C, it is preferable to bite into or make firm contact with the tumor C to some extent even when the elongated tube 80 does not puncture the tumor C. When the elongated tube 80 does not puncture the tumor C, the tumor C can be prevented from scattering to other sites.

When it is determined that the tumor cells have been sufficiently killed, when it is determined that further irradiation is not desirable, or when a predetermined time has elapsed, the operator stops the irradiation with the near-infrared ray and stops monitoring by the measurement device 50. After this, the operator specifies and records the position of the tumor C that has been irradiated with the near-infrared ray. Next, the operator collects the elongated tube 80 and the optical fiber 41 in the endoscope 70.

As a modification example of the elongated tube 80, the distal portion of the elongated tube 80 may have a light-transmitting portion formed of a transparent material that can transmit near-infrared rays. In this case, the optical fiber 41 may not protrude from the needle tip 81. The optical fiber 41 can transmit the near-infrared ray from the inside of the elongated tube 80 through the elongated tube 80 and irradiate the tumor C with the near-infrared ray. Further, the measurement device 50 can measure the temperature or hardness of the tumor C through the transparent elongated tube 80 in a non-contact manner. Note that, the light-transmitting portion is preferably provided only at a part on the distal side of the elongated tube 80. By configuring in this manner, it becomes possible to prevent places other than the tumor C from being irradiated with the near-infrared ray.

Figure 6A:
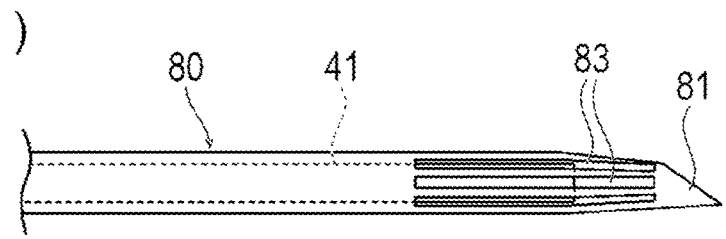
FIGS. 6A and 6B are plan views showing a modification example of the treatment system.

Further, in the elongated tube 80, as in another modification example shown in FIG. 6A, at least one slit 83 may be formed at the needle tip 81. The number or shape of the slits 83 is not particularly limited. In this case, the optical fiber 41 may not protrude from the needle tip 81. The optical fiber 41 can irradiate the tumor C with the near-infrared ray from the inside of the elongated tube 80 through the slit 83. Further, the measurement device 50 can measure the temperature or hardness of the tumor C through the slit 83 in a non-contact manner. Note that, the slit 83 is preferably provided only at a part on the distal side of the elongated tube 80. By configuring in this manner, it becomes possible to prevent locations other than the tumor C from being irradiated with the near-infrared ray.

Figure 6B:
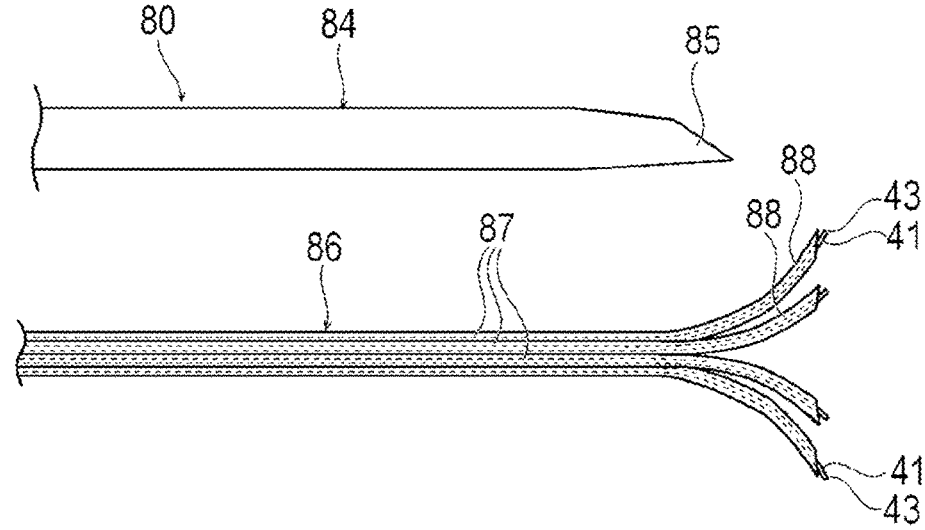

Further, as in another modification example shown in FIG. 6B, the elongated tube 80 may include a hollow outer needle 84 having an outer needle tip 85 at the distal end and an inner needle 86 that can be inserted into the inside of the outer needle 84. The inner needle 86 has a plurality of hollow branch needles 87 of which distal portions widen (i.e., spread out) in the distal end direction. The plurality of branch needles 87 is preferably fixed as a bundle except for the widened distal portions. The branch needle 87 can be elastically deformable. The number of branch needles 87 is not particularly limited, but the number of branch needles 87 is preferably two or more. Sharp inner needle tips 88 are formed at the distal ends of each branch needle 87. When the elongated tube 80 has the plurality of branch needles 87, it is preferable that a plurality of the optical fibers 41 is provided so as to be insertable into the respective branch needles 87.

Figure 9A:
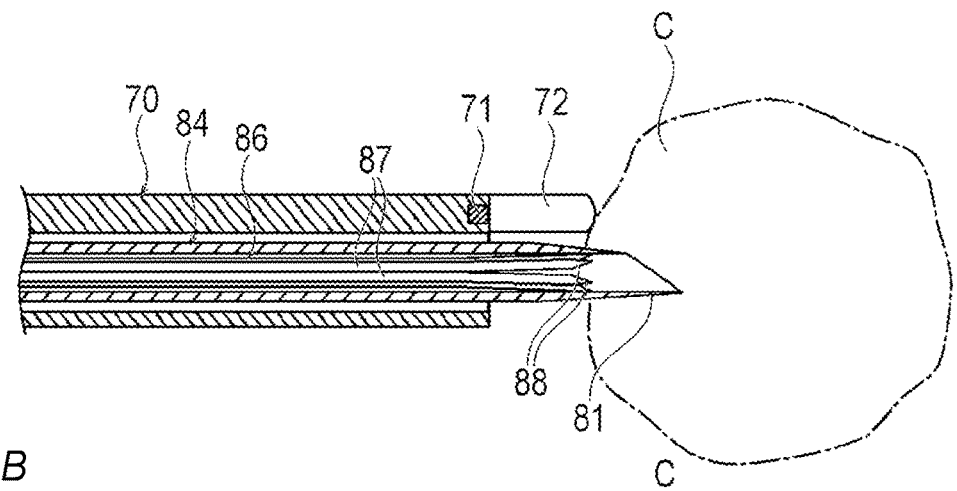
FIGS. 9A and 9B are cross-sectional views showing a state when treating the stomach cancer using an elongated tube according to a modification example.
Figure 9B:
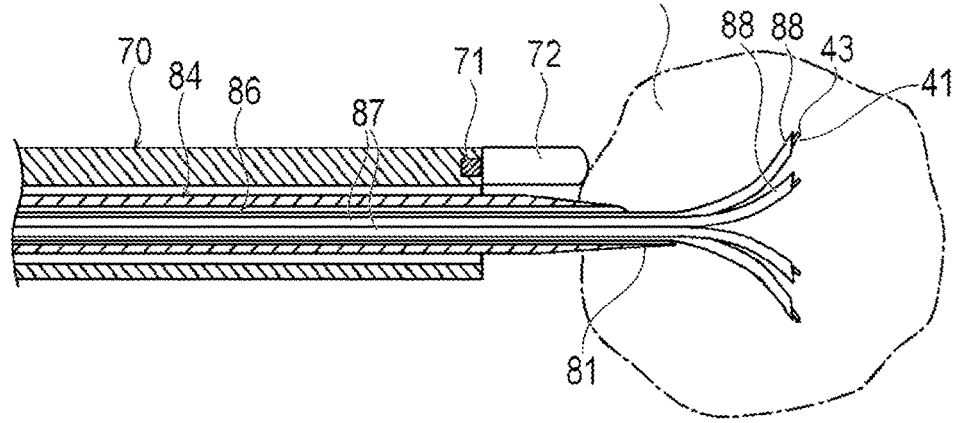

When the elongated tube 80 has the outer needle 84 and the inner needle 86, as shown in FIG. 9A, the operator punctures the tumor C with the outer needle 84 in a state where the inner needle 86 is accommodated in the outer needle 84. Thereafter, as shown in FIG. 9B, the operator can make the inner needle 86 protrude from the outer needle 84. Thereby, the inner needle 86 widens inside the tumor C. Thereafter, the optical fiber 41 is inserted into each branch needle 87, and the near-infrared ray is emitted from each branch needle 87. Therefore, the plurality of optical fibers 41 can rather efficiently irradiate the entire tumor C with the near-infrared ray. The optical fiber 41 may be fixedly disposed in each branch needle 87.

As described above, the treatment method according to the third embodiment is the treatment method for irradiating the antibody-photosensitive substance bound to the tumor cell membrane in the tumor cell with the near-infrared ray, the method including: intravenously administering the antibody-photosensitive substance; inserting the endoscope 70 from a mouth, a nose, or an anal and allowing the endoscope 70 to reach a vicinity of the tumor C reachable from the mouth, the nose, or the anal; making the tubular elongated tube 80, in which the lumen 82 is formed, protrude from the endoscope 70; bringing the elongated tube 80 into contact with the tumor C while checking a camera image and/or an ultrasound image obtained by the endoscope 70; allowing the optical fiber 41 inserted into the lumen 82 of the elongated tube 80 to reach an inside or the vicinity of the tumor C; and irradiating the antibody-photosensitive substance bound to the tumor cell membrane with the near-infrared ray from the optical fiber 41 after 12 hours to 36 hours from the intravenous administration.

According to the treatment method having the above-described configuration, the elongated tube 80 can come into contact with the tumor C with relatively high accuracy and relative ease while checking the camera image and/or the ultrasound image of the endoscope 70 inserted from the mouth, the nose or the anal. Therefore, the position of the elongated tube 80 with respect to the tumor C can be excellently maintained, and the optical fiber 41 inserted into the elongated tube 80 can irradiate the tumor C with the near-infrared ray. Therefore, according to this treatment method, the antibody-photosensitive substance bound to the tumor cell membrane can be effectively irradiated with the near-infrared ray from the inside or the vicinity of the tumor C, and the effect of killing the tumor cells can be enhanced.

The treatment system 60 used in the third embodiment is the treatment system 60 capable of irradiating the antibody-photosensitive substance bound to the tumor cell membrane in the tumor cell with a near-infrared ray, the system including: the endoscope 70 having the camera 71 and/or the ultrasound imaging device 72; the tubular elongated tube 80 insertable into the endoscope 70 and having the lumen 82 formed in the tubular elongated tube 80; the optical fiber 41 insertable into the lumen 82 and capable of emitting the near-infrared ray; and the measurement device 50 that is insertable into the lumen 82 and monitors irradiation of a site, which is irradiated with the near-infrared ray, with the near-infrared ray.

According to the treatment system 60 having the above-described configuration, the elongated tube 80 passing through the endoscope 70 can come into contact with the tumor C with relatively high accuracy and rather easily while checking the camera image and/or the ultrasound image of the endoscope 70. Therefore, the position of the elongated tube 80 with respect to the tumor C can be excellently maintained, and the optical fiber 41 inserted into the elongated tube 80 can irradiate the tumor C with the near-infrared ray. Therefore, it is possible to effectively irradiate the antibody-photosensitive substance bound to the tumor cell membrane with the near-infrared ray from the inside or the vicinity of the tumor C. Further, it is possible to proceed with the procedure while checking with the measurement device 50 that the antibody-photosensitive substance receives the near-infrared ray, the temperature increases, and the tumor cell is killed.

Fourth Embodiment

Similar to the treatment method according to the third embodiment, a treatment method according to a fourth embodiment is applied to cancer treatment of an organ that can be reached from the mouth, the nose, or the anal. The treatment method according to the fourth embodiment can be suitably used for the treatment of, for example, pancreatic cancer, lung cancer, stomach cancer, duodenal cancer, esophageal cancer, colon cancer, and the like. The treatment method according to the fourth embodiment is different from that of the third embodiment in that the antibody-photosensitive substance is not administered intravenously but locally into the tumor C or to the vicinity of the tumor C. Note that, a treatment system is the same as the treatment system 60 used in the treatment method according to the third embodiment.

In the treatment method according to the fourth embodiment, the operator inserts the endoscope 70 from the mouth, the nose, or the anal without intravenously administering the antibody-photosensitive substance, and causes the endoscope 70 to reach the vicinity of the tumor C. Next, the operator inserts the elongated tube 80 into the proximal portion of the endoscope 70 and causes the elongated tube 80 to protrude from the distal portion of the endoscope 70. Then, the operator punctures the tumor C with the needle tip 81 of the elongated tube 80 while checking the camera image and/or the ultrasound image of the endoscope 70. Thereby, the position of the elongated tube 80 is fixed with respect to the tumor C.

Next, the operator locally administers the antibody-photosensitive substance from the proximal side of the elongated tube 80 into the tumor C through the lumen 82. After locally administering the antibody-photosensitive substance into the tumor C, the operator waits until the antibody-photosensitive substance binds to the target cell membrane. When the antibody-photosensitive substance is locally administered into the tumor C to be treated, the time until the antibody-photosensitive substance binds to the target cell membrane is much shorter than that for intravenous administration, and is considered to be, for example, approximately 5 minutes to 10 minutes.

Next, the operator inserts the optical fiber 41 and the measurement device 50 from the proximal side of the lumen 82 of the elongated tube 80. Then, while the near-infrared ray is emitted from the optical fiber 41, the measurement device 50 monitors that the tumor cell to which the antibody-photosensitive substance is bound is irradiated with the near-infrared ray. The irradiation with the near-infrared ray starts, for example, approximately 5 minutes to 10 minutes after locally administering the antibody-photosensitive substance. The irradiation with the near-infrared ray may not be started after approximately 5 minutes to 10 minutes. Since the subsequent procedure is the same as the treatment method according to the third embodiment, a detailed description of the treatment method will be omitted.

As described above, the treatment method according to the fourth embodiment is the treatment method for irradiating the antibody-photosensitive substance bound to the tumor cell membrane in the tumor cell with the near-infrared ray, the method including: inserting the endoscope 70 from a mouth, a nose, or an anal and allowing the endoscope 70 to reach a vicinity of the tumor cell reachable from the mouth, the nose, or the anal; making the tubular elongated tube 80, in which the lumen 82 is formed and the sharp needle tip 81 is formed at an end portion, protrude from the endoscope 70; puncturing the tumor C with the needle tip 81 while checking a camera image and/or an ultrasound image obtained by the endoscope 70; administering the antibody-photosensitive substance into the tumor C through the elongated tube 80; allowing the optical fiber 41 inserted into the lumen 82 of the elongated tube 80 to reach an inside or the vicinity of the tumor C; and irradiating the antibody-photosensitive substance bound to the tumor cell membrane with the near-infrared ray from the optical fiber 41.

According to the treatment method having the above-described configuration, the elongated tube 80 can puncture the tumor C with relatively high accuracy and rather easily while checking the camera image and/or the ultrasound image of the endoscope 70 inserted from the mouth, the nose or the anal. Therefore, the position of the elongated tube 80 with respect to the tumor C can be excellently maintained, and the optical fiber 41 inserted into the elongated tube 80 can irradiate the tumor C with the near-infrared ray. Therefore, according to this treatment method, the antibody-photosensitive substance bound to the tumor cell membrane can be effectively irradiated with the near-infrared ray from the inside or the vicinity of the tumor C, and the effect of killing tumor cells can be enhanced. Further, since the antibody-photosensitive substance is locally administered, it is possible to bind the antibody-photosensitive substance to the tumor cell membrane in a relatively short time with relatively high probability. In addition, since the antibody-photosensitive substance can be administered only at a necessary location, the burden on the living body can be reduced.

Fifth Embodiment

A treatment method according to a fifth embodiment is applied to cancer treatment of organs that can be reached percutaneously. The treatment method according to the fifth embodiment can be suitably used for the treatment of, for example, breast cancer, liver cancer, skin cancer, head and neck cancer, and the like.

Figure 10:
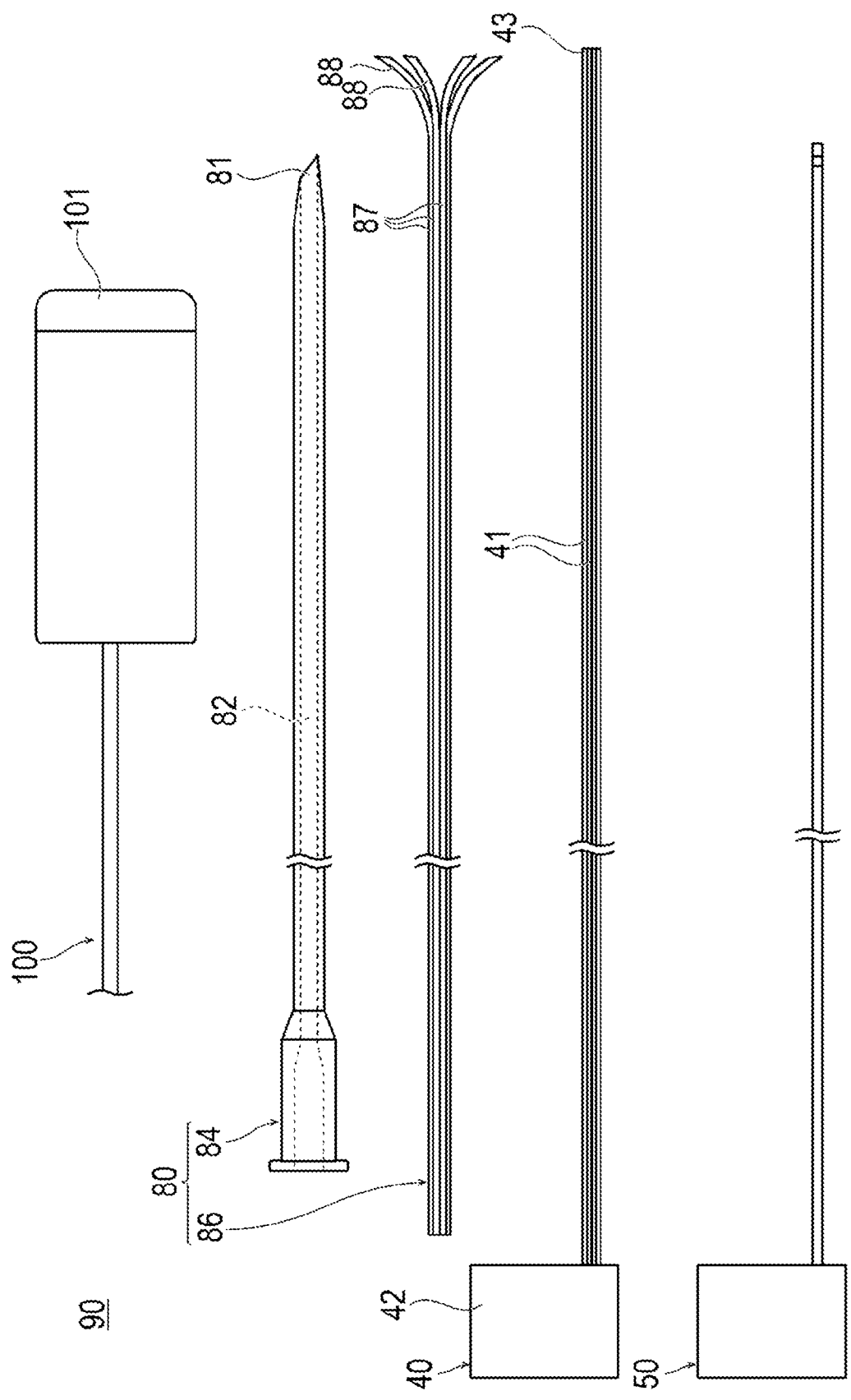
FIG. 10 is a plan view showing a treatment system used in a treatment method according to a fifth embodiment.

In the treatment method according to the fifth embodiment, in order to irradiate the antibody-photosensitive substance bound to the target cell with the near-infrared ray, as shown in FIG. 10, a treatment system 90 that can perform puncturing percutaneously and be inserted into the body is used. The treatment system 90 includes the elongated tube 80 having the outer needle 84 and the inner needle 86, the light irradiation device 40 that can be inserted into the elongated tube 80, the measurement device 50 that can be inserted into the elongated tube 80, and an ultrasound diagnostic device 100.

The elongated tube 80 can be the elongated tube 80 shown in FIG. 6B as a modification example of the third embodiment, and includes the outer needle 84 and the inner needle 86. The ultrasound diagnostic device 100 is a known device that can acquire an ultrasound image. The ultrasound diagnostic device 100 includes a probe 101 that transmits and receives ultrasound waves. The light irradiation device 40 can include the plurality of optical fibers 41 corresponding to the number of branch needles 87 of the inner needle 86. Each optical fiber 41 can be inserted into the branch needle 87. Alternatively, the optical fiber 41 may be fixed inside the branch needle 87.

Next, the treatment method according to the fifth embodiment will be described taking a case of treating breast cancer as an example. Note that, this description is not intended to limit the organs to be treated.

Figure 11:
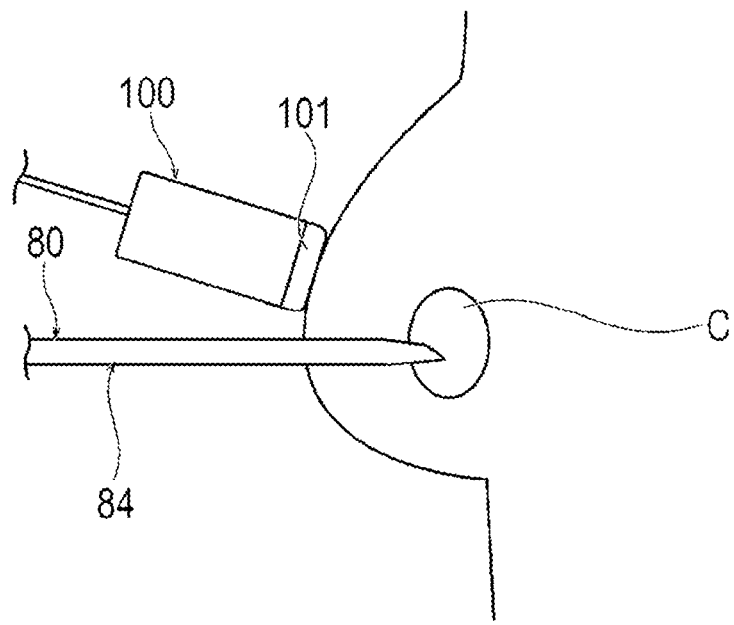
FIG. 11 is a schematic view showing a state inside a body when treating breast cancer by the treatment method according to the fifth embodiment.
Figure 12A:
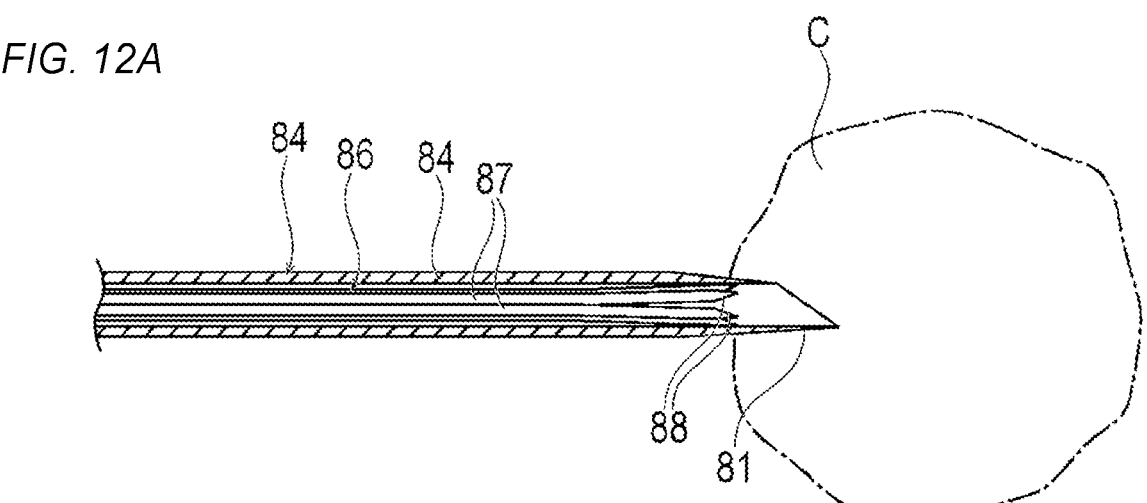
FIGS. 12A and 12B are cross-sectional views showing a state when treating the breast cancer using the treatment system.
Figure 12B:
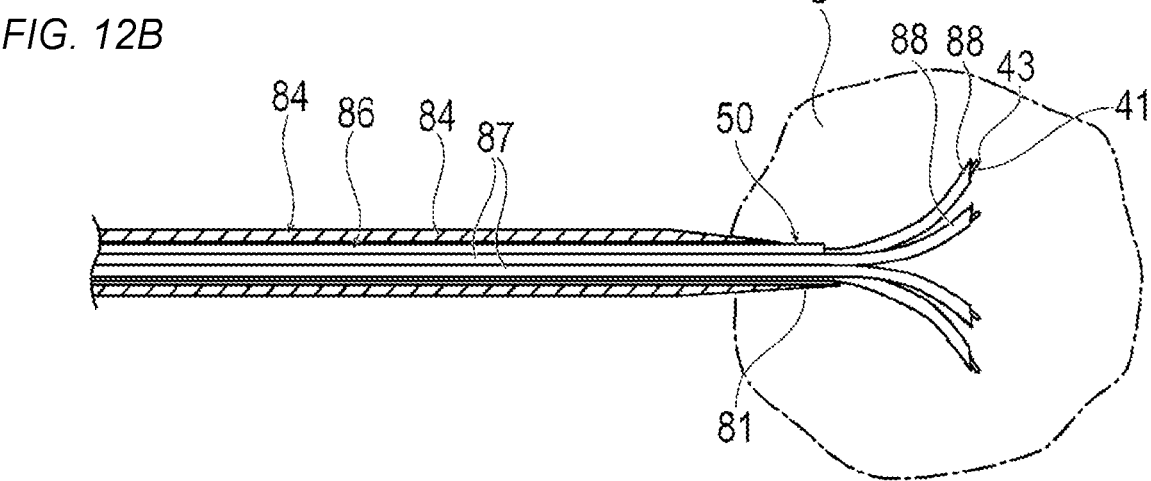

First, the operator administers the antibody-photosensitive substance intravenously. After approximately, for example, 12 hours to 36 hours from the intravenous administration, as shown in FIG. 11, the operator brings the probe 101 of the ultrasound diagnostic device 100 into contact with the skin. Next, while checking the ultrasound image, as shown in FIG. 12A, the operator punctures the tumor C from the skin positioned in the vicinity of the tumor C with the outer needle 84 accommodating the inner needle 86 of which the inner needle tips 88 are elastically deformed. The outer needle 84 may not puncture the tumor C but the vicinity of the tumor C. After the operator punctures the tumor C or the vicinity of the tumor C with the outer needle 84, as shown in FIG. 12B, the operator makes the inner needle 86 protrude from the outer needle 84 toward the distal side. Thereby, the inner needle 86 widens on the inside of the tumor C or the vicinity of the tumor C. Accordingly, the position of the inner needle 86 is fixed with respect to the tumor C. At this time, it is preferable at least one of the plurality of branch needles 87 punctures the tumor C, and it is more preferable that all the branch needles 87 puncture the tumor C. Note that, a case where all the branch needles 87 do not puncture the tumor C but the vicinity of the tumor C is also possible.

Next, the operator inserts the optical fiber 41 into each branch needle 87. The irradiation unit 43 of each optical fiber 41 protrudes from the branch needle 87. Thereby, the operator can emit the near-infrared ray from the optical fiber 41 inserted into each branch needle 87. Therefore, the plurality of optical fibers 41 can efficiently irradiate the entire tumor C with the near-infrared ray. Note that, the optical fiber 41 may not protrude from the branch needle 87. Further, the optical fiber 41 and/or the measurement device 50 may be disposed in advance in the branch needle 87 before puncturing.

The distal portion of the branch needle 87 may have a light-transmitting portion formed of a transparent material that transmits near-infrared rays. Thereby, the optical fiber 41 may not protrude from the branch needle 87. The optical fiber 41 can transmit the near-infrared ray from the inside of the branch needle 87 through the branch needle 87 and irradiate the tumor C with the near-infrared ray. Note that, the light-transmitting portion is preferably provided only at a part on the distal side of the branch needle 87. By configuring in this manner, it becomes possible to prevent locations other than the tumor C from being irradiated with the near-infrared ray.

Further, the branch needle 87 may have a slit. Thereby, the optical fiber 41 may not protrude from the branch needle 87. The optical fiber 41 can irradiate the tumor C with the near-infrared ray from the inside of the branch needle 87 through the slit. Note that, the slit is preferably provided only at a part on the distal side of the branch needle 87. By configuring the slit in this manner, it becomes possible to prevent places other than the tumor C from being irradiated with the near-infrared ray.

Next, the operator inserts the measurement device 50 from the proximal side of the lumen 82 of the outer needle 84 of the elongated tube 80. The distal portion of the measurement device 50 protrudes from the outer needle 84 toward the distal side on the inside of the hole formed in the tumor C by the outer needle 84.

Next, the operator measures the temperature or hardness of the tumor C with the measurement device 50 while emitting the near-infrared ray from the plurality of optical fibers 41. By continuing the measurement of the tumor C, it is possible to monitor in real time that the target cell to which the antibody-photosensitive substance is bound is irradiated with the near-infrared ray. The irradiation with the near-infrared ray starts, for example, 12 hours to 36 hours after intravenous administration.

The irradiation direction of the near-infrared ray from the optical fiber 41 is appropriately selected. For example, the irradiation direction of the near-infrared ray may be the distal end direction of the optical fiber 41, the direction orthogonal to the axial direction of the optical fiber 41, or all directions.

The operator continues the irradiation with the near-infrared ray while checking the death of the tumor cells by the irradiation with the near-infrared ray by monitoring with the measurement device 50. When it is determined that the tumor cells have been sufficiently killed, when it is determined that further irradiation is not desirable, or when a predetermined time has elapsed, the operator stops the irradiation with the near-infrared ray and stops monitoring by the measurement device 50. Next, the operator pulls the inner needle 86 toward the proximal side and accommodates the inner needle 86 in the outer needle 84. Thereby, the branch needles 87 are accommodated in the outer needle 84 while being deformed linearly. After this, the operator specifies and records the position of the tumor C that has been irradiated with the near-infrared ray. Next, the operator removes the outer needle 84 together with the inner needle 86, the optical fiber 41, and the measurement device 50 from the skin.

The monitoring of the irradiation with the near-infrared ray may be performed by the optical fiber 41 for near-infrared ray irradiation. Since the plurality of optical fibers 41 is provided, the temperature can be measured by each optical fiber 41. Therefore, according to the temperature measured by each optical fiber 41, the irradiation with the near-infrared ray from each optical fiber 41 can be controlled separately. The measurement device 50 may be a temperature measurement device using a thermocouple or a hardness measurement device using ultrasound waves. Further, the monitoring of the irradiation with the near-infrared ray may be performed by a sensor disposed outside the body or a sensor inserted into the lumen in a living body.

As described above, the treatment method according to the fifth embodiment is the treatment method for irradiating the antibody-photosensitive substance bound to the tumor cell membrane in the tumor cell with the near-infrared ray, the method including: intravenously administering the antibody-photosensitive substance; percutaneously puncturing the tumor C or a vicinity of the tumor C with the hollow outer needle 84, while percutaneously acquiring and checking an ultrasound image; making the inner needle 86 having the plurality of sharp inner needle tips 88 protrude from the outer needle 84, and puncturing the tumor C or the vicinity of the tumor C with the inner needle tips 88; and irradiating the antibody-photosensitive substance bound to the tumor cell membrane with the near-infrared ray from the optical fiber 41 inserted into the inner needle 86 after, for example, 12 hours to 36 hours from the intravenous administration.

According to the treatment method having the above-described configuration, the outer needle 84 and the inner needle 86 can puncture desired positions with relatively high accuracy and rather easily while checking the ultrasound image. Therefore, the position of the inner needle 86 with respect to the tumor C can be excellently maintained, and the optical fiber 41 disposed in the inner needle 86 can irradiate the tumor C with the near-infrared ray. Therefore, according to this treatment method, the antibody-photosensitive substance bound to the tumor cell membrane can be effectively irradiated with the near-infrared ray from the inside or the vicinity of the tumor C, and the effect of killing the tumor cells can be enhanced.

The treatment system 90 used in the fifth embodiment is the treatment system 90 capable of irradiating the antibody-photosensitive substance bound to the tumor cell membrane in the tumor cell with the near-infrared ray, the system including: the ultrasound diagnostic device 100; the hollow outer needle 84; the inner needle 86 insertable into the outer needle 84 and having the plurality of inner needle tips 88; the optical fiber 41 capable of being disposed in the inner needle 86 and emitting the near-infrared ray; and the measurement device 50 that is capable of being disposed in the outer needle 84 or the inner needle 86, and monitors irradiation of a site, which is irradiated with the near-infrared ray, with the near-infrared ray.

According to the treatment system 90 having the above-described configuration, the outer needle 84 and the inner needle 86 can puncture desired positions with relatively high accuracy and rather easily while checking the ultrasound image. Therefore, the position of the inner needle 86 with respect to the tumor C can be excellently maintained, and the optical fiber 41 disposed in the inner needle 86 can irradiate the tumor C with the near-infrared ray. Therefore, according to this treatment method, the antibody-photosensitive substance bound to the tumor cell membrane can be effectively irradiated with the near-infrared ray from the inside or the vicinity of the tumor C, and the effect of killing the tumor cells can be enhanced. Further, it is possible to proceed with the procedure while checking with the measurement device 50 that the antibody-photosensitive substance receives the near-infrared ray, the temperature increases, and the tumor cell is killed.

Sixth Embodiment

Similar to the treatment method according to the fifth embodiment, a treatment method according to a sixth embodiment is applied to cancer treatment of an organ that can be reached percutaneously. The treatment method according to the sixth embodiment can be suitably used for the treatment of, for example, breast cancer, liver cancer, skin cancer, head and neck cancer, and the like. Note that, the treatment method according to the sixth embodiment is different from that of the fifth embodiment in that the antibody-photosensitive substance is not administered intravenously but locally into the tumor C or to the vicinity of the tumor C by the branch needles 87 of the elongated tube 80. Further, the treatment device is the same as the device used in the treatment method according to the fifth embodiment.

In the treatment method according to the sixth embodiment, the operator punctures the tumor C or the vicinity of tumor C from the skin positioned in the vicinity of the tumor C with the outer needle 84 of the elongated tube 80 while checking the ultrasound image without intravenously administering the antibody-photosensitive substance. The operator can make the inner needle 86 protrude from the outer needle 84 after puncturing the outer needle 84. Thereby, the inner needle 86 widens inside the tumor C or the vicinity of the tumor C. Accordingly, the position of the inner needle 86 is fixed with respect to the tumor C.

Next, the operator locally administers the antibody-photosensitive substance from the proximal side of the inner needle 86 through the inside of the inner needle 86 into the tumor C or to the vicinity of the tumor C. After locally administering the antibody-photosensitive substance, the operator waits until the antibody-photosensitive substance binds to the target cell membrane. When the antibody-photosensitive substance is locally administered into the tumor C to be treated, the time until the antibody-photosensitive substance binds to the target cell membrane is much shorter than that for intravenous administration, and is considered to be, for example, approximately 5 minutes to 10 minutes.

Next, the operator inserts the optical fiber 41 into each branch needle 87. Since the subsequent procedure is the same as the treatment method according to the fifth embodiment, a detailed description of treatment method will be omitted. The irradiation with the near-infrared ray starts, for example, approximately 5 minutes to 10 minutes after locally administering the antibody-photosensitive substance. The irradiation with the near-infrared ray may not be started after approximately 5 minutes to 10 minutes.

As described above, the treatment method according to the sixth embodiment is the treatment method for irradiating the antibody-photosensitive substance bound to the tumor cell membrane in the tumor cell with the near-infrared ray, the method including: percutaneously puncturing the tumor C or a vicinity of the tumor C with the hollow outer needle 84, while percutaneously acquiring and checking an ultrasound image; making the inner needle 86 having the plurality of sharp inner needle tips 88 protruding from the outer needle 84, and puncturing the tumor C or the vicinity of the tumor C with the inner needle tips 88; administering the antibody-photosensitive substance to the tumor C or the vicinity of the tumor C through the inner needle 86; and irradiating the antibody-photosensitive substance bound to the tumor cell membrane with the near-infrared ray from the optical fiber 41 inserted into the inner needle 86.

According to the treatment method having the above-described configuration, the outer needle 84 and the inner needle 86 can puncture desired positions with relatively high accuracy and rather easily while checking the ultrasound image. Therefore, the position of the inner needle 86 with respect to the tumor C can be excellently maintained, and the optical fiber 41 disposed in the inner needle 86 can irradiate the tumor C with the near-infrared ray. Therefore, according to this treatment method, the antibody-photosensitive substance bound to the tumor cell membrane can be effectively irradiated with the near-infrared ray from the inside or the vicinity of the tumor C, and the effect of killing the tumor cells can be enhanced. Further, since the antibody-photosensitive substance is locally administered, it is possible to bind the antibody-photosensitive substance to the tumor cell membrane in a relatively short time with relatively high probability. In addition, since the antibody-photosensitive substance can be administered only at a necessary place, the burden on the living body can be reduced.

The detailed description above describes embodiments of a treatment method and a treatment system for killing tumor cells representing examples of the inventive method and system disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A treatment method for irradiating an antibody-photosensitive substance bound to a tumor cell membrane in a tumor cell with a near-infrared ray, the method comprising:
   intravenously administering the antibody-photosensitive substance;
   inserting a guide wire into a main artery of an organ having the tumor cell, and inserting a catheter along the guide wire after 12 hours to 36 hours from the intravenous administration of the antibody-photosensitive substance;
   removing the guide wire from the catheter;
   after removing the guide wire from the catheter, inserting an optical fiber into the catheter and advancing the optical fiber to a target position while checking a position of the optical fiber with an orientation marker disposed on the optical fiber; and
   transvascularly irradiating the antibody-photosensitive substance, which has been bound to the tumor cell membrane for 12 hours to 36 hours via intravenous administration, with the near-infrared ray from the optical fiber inserted into the artery while reducing an influence of blood in the artery on the near-infrared ray.

2. The treatment method according to claim 1, wherein the reducing of the influence of blood in the artery on the near-infrared ray further comprises:
   injecting a saline solution into the artery through the catheter to flush the blood in the artery.

3. The treatment method according to claim 2, further comprising:
   injecting the saline solution into the artery in a lumen between an inner diameter of the catheter and an outer diameter of the optical fiber.

4. The treatment method according to claim 1, wherein the reducing of the influence of blood in the artery on the near-infrared ray further comprises:
   inflating a balloon disposed in the catheter to block a blood flow in the artery.

5. The treatment method according to claim 1, wherein the emitting of the near-infrared ray from the optical fiber further comprises:
   monitoring the irradiation of the antibody-photosensitive substance with the near-infrared ray.

6. The treatment method according to claim 5, wherein the monitoring of the irradiation of the antibody-photosensitive substance with the near-infrared ray further comprises:
   monitoring a temperature of the tumor cell having the tumor cell membrane to which the antibody-photosensitive substance is bound or a vicinity of the tumor cell with the optical fiber that emits the near-infrared ray.

7. The treatment method according to claim 5, wherein the monitoring of the irradiation of the antibody-photosensitive substance with the near-infrared ray further comprises:
   inserting an optical fiber for measurement into the catheter, and monitoring a temperature of the tumor cell having the tumor cell membrane to which the antibody-photosensitive substance is bound or a vicinity of the tumor cell by the optical fiber for measurement.

8. The treatment method according to claim 5, wherein the monitoring of the irradiation of the antibody-photosensitive substance with the near-infrared ray further comprises:
   inserting a hardness measurement device having a probe capable of transmitting and receiving ultrasound waves into the catheter; and
   monitoring a hardness of a tumor tissue mass having the tumor cell membrane to which the antibody-photosensitive substance is bound by the hardness measurement device.

9. The treatment method according to claim 5, wherein the monitoring of the irradiation of the antibody-photosensitive substance with the near-infrared ray further comprises:
   inserting a contact type temperature sensor into the catheter; and
   monitoring a temperature of a tumor cell having a tumor cell membrane to which the antibody-photosensitive substance is bound or a vicinity of the tumor cell by the temperature sensor.

10. The treatment method according to claim 1, further comprising:
    specifying a site irradiated with the near-infrared ray after the emitting of the near-infrared ray from the optical fiber.

11. The treatment method according to claim 1, wherein the transvascularly irradiation of the antibody-photosensitive substance bound to the tumor cell membrane from the optical fiber inserted into the artery without administering the antibody-photosensitive substance through the catheter.

12. A treatment method for irradiating an antibody-photosensitive substance bound to a tumor cell membrane in a tumor cell with a near-infrared ray, the method comprising:
- inserting a guide wire into a main artery of an organ having the tumor cell, and inserting a catheter along the guide wire;
- removing the guide wire from the catheter;
- after removing the guide wire from the catheter, administering the antibody-photosensitive substance into the artery though a lumen of the catheter;
- inserting an optical fiber into the lumen of the catheter and advancing the optical fiber to a target position while checking a position of the optical fiber with an orientation marker disposed on the optical fiber;
- waiting for the antibody-photosensitive substance administered into the artery though the lumen of the catheter to be bound to the tumor cell membrane; and
- transvascularly irradiating the antibody-photosensitive substance bound to the tumor cell membrane with the near-infrared ray from the optical fiber inserted into the artery while reducing an influence of blood in the artery on the near-infrared ray by injecting a saline solution without the antibody-photosensitive substance into the artery through the lumen of the catheter with the optical fiber inserted to flush the blood in the artery after administering the antibody-photosensitive substance into the artery through the lumen of the catheter.

13. The treatment method according to claim 12, further comprising:
- injecting the saline solution into the artery in a lumen between an inner diameter of the catheter and an outer diameter of the optical fiber.

14. The treatment method according to claim 12, wherein the reducing of the influence of blood in the artery on the near-infrared ray further comprises:
- inflating a balloon disposed in the catheter to block a blood flow in the artery after intravenously administering the antibody photosensitive substance so as to temporarily fill the artery.

15. The treatment method according to claim 12, wherein the emitting of the near-infrared ray from the optical fiber further comprises:
- monitoring the irradiation of the antibody-photosensitive substance with the near-infrared ray.

16. The treatment method according to claim 15, wherein the monitoring of the irradiation of the antibody-photosensitive substance with the near-infrared ray further comprises:
- monitoring a temperature of the tumor cell having the tumor cell membrane to which the antibody-photosensitive substance is bound or a vicinity of the tumor cell by the optical fiber that emits the near-infrared ray.

17. The treatment method according to claim 15, wherein the monitoring of the irradiation of the antibody-photosensitive substance with the near-infrared ray further comprises:
- inserting an optical fiber for measurement is inserted into the catheter; and
- monitoring a temperature of the tumor cell having the tumor cell membrane to which the antibody-photosensitive substance is bound or a vicinity of the tumor cell by the optical fiber for measurement.

18. The treatment method according to claim 15, wherein the monitoring of the irradiation of the antibody-photosensitive substance with the near-infrared ray further comprises:
- inserting a hardness measurement device having a probe capable of transmitting and receiving ultrasound waves into the catheter; and
- monitoring a hardness of a tumor tissue mass having the tumor cell membrane to which the antibody-photosensitive substance is bound by the hardness measurement device; or p1 monitoring a temperature of a tumor cell having the tumor cell membrane to which the antibody-photosensitive substance is bound or a vicinity of the tumor cell by the temperature sensor.

19. The treatment method according to claims 12, further comprising:
- specifying a site irradiated with the near-infrared ray after the emitting of the near-infrared ray from the optical fiber.

20. A treatment system capable of irradiating an antibody-photosensitive substance bound to a tumor cell membrane in a tumor cell with a near-infrared ray, the system comprising:
- a catheter having a lumen and configured to be inserted into a blood vessel;
- an optical fiber configured to emit the near-infrared ray; and
- a measurement device configured to monitor irradiation of a site, which is irradiated with the near-infrared ray, with the near-infrared ray, the measurement device being elongated and formed separately from the optical fiber so as to be insertable into the lumen of the catheter,
- wherein the catheter is configured to allow the optical fiber and the measurement device to be inserted simultaneously into the lumen,
- wherein, when the optical fiber and the measurement device are inserted simultaneously into the lumen at the same time and both of a distal end of the optical fiber and a distal end of the measurement device protrude from a distal end of the catheter into the blood vessel, a gap is formed in the lumen between an inner surface of the catheter and both of an outer surface of the optical fiber and an outer surface of the measurement device so as to allow a saline solution without the antibody-photosensitive substance to flow into the blood vessel through the gap.

* * * * *